(No Model.)
R. L. LUKENS.
PULVERIZING HARROW.
No. 364,831. Patented June 14, 1887.
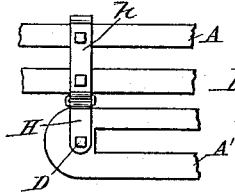
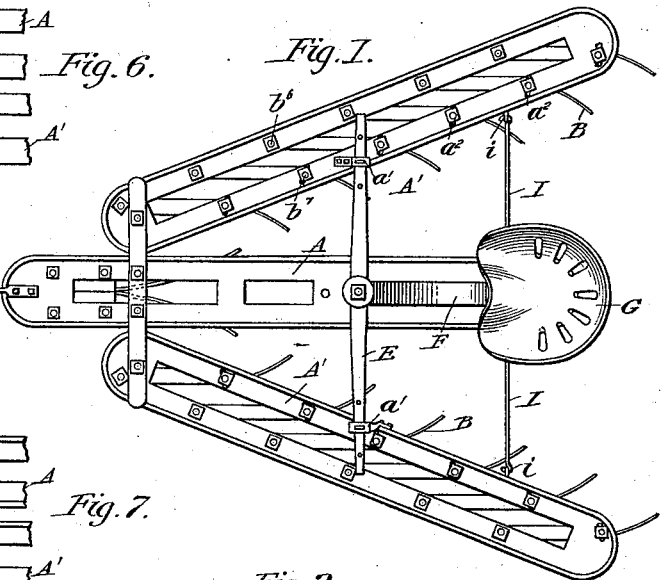
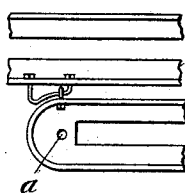
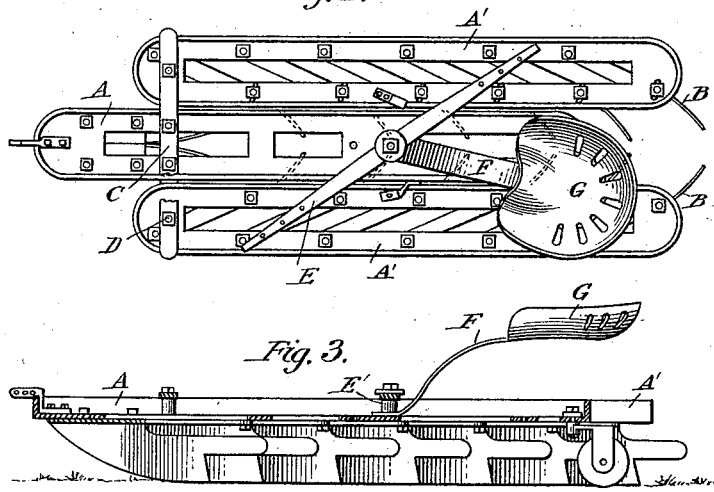
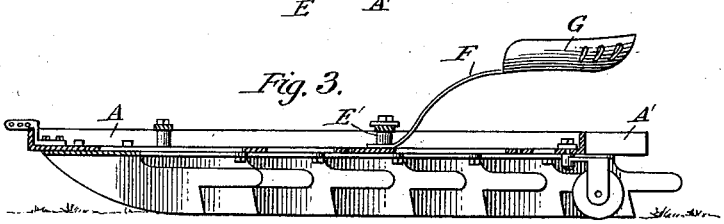
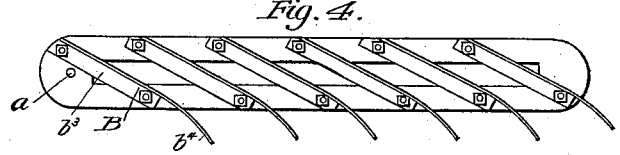
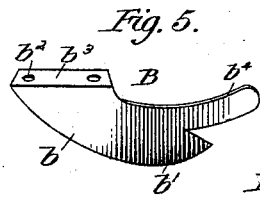
Witnesses.
J. S. Clark.
David H. Mead.
Inventor:
Richard L. Lukens.
By Wiles, Greene & Mead
Attorneys.

UNITED STATES PATENT OFFICE.

RICHARD L. LUKENS, OF PEORIA, ILLINOIS.

PULVERIZING-HARROW.

SPECIFICATION forming part of Letters Patent No. 364,831, dated June 14, 1887.

Application filed November 29, 1886. Serial No. 220,191. (No model.)

*To all whom it may concern:*

Be it known that I, RICHARD L. LUKENS, a citizen of the United States, residing at Peoria, in the county of Peoria and State of Illinois, have invented certain new and useful Improvements in Pulverizing - Harrows; and I do hereby declare that the following is a full, clear, and exact description of the invention, which will enable others skilled in the art to which it appertains to make and use the same.

This invention relates to pulverizing-harrows.

The object of the invention is to produce a pulverizing-harrow which shall be capable in operation of cutting or loosening the earth, and moving it a short distance, somewhat after the manner of a plow, the more effectually to accomplish the dividing of the soil into fine particles; furthermore, the object is to produce a pulverizing-harrow which shall be made up of a frame composed of parts of such construction as to allow them to be made interchangeable in order to cheapen the cost of construction and to render it possible to shift the parts from side to side, when desired; and, furthermore, the object of the invention is to produce a harrow of such construction that it will automatically adapt itself to unevenness in the ground upon which it is used.

With these objects in view my invention consists in a pulverizing-harrow made up of three frames of the same size and form, secured together by hinge or other suitable joints, in order that they may be folded compactly together.

Furthermore, the invention resides in a pulverizing-harrow made up of three frames secured together by a hinge or similar joint, and teeth or blades adjustably secured to the outer frames.

Furthermore, the invention resides in a pulverizing-harrow consisting in three frames secured together by a hinge-joint, permitting movement in a horizontal and a vertical direction, and a removable bar adapted to be placed over the joints to prevent vertical movement, when so desired.

Furthermore, the invention resides in various novel details of construction, whereby the objects of the invention are attained.

I have illustrated the invention in the accompanying drawings, in which Figure 1 is a plan view of a harrow constructed in accordance with my invention. Fig. 2 is a similar view, the harrow being shown in a closed position. Fig. 3 is a sectional view, the section being taken through the center of the middle frame of the harrow. Fig. 4 is an inverted plan view of one of the wings, showing the arrangement of the teeth or blades. Fig. 5 is a perspective view of one of the harrow teeth or blades. Fig. 6 represents the hinge for joining the parts, and Fig. 7 represents a modified form of hinge.

In these drawings, A, A' and A' represent, respectively, the middle and side frames of which the body of the cultivator is made up. These three frames are preferably of the same shape and size. They are made of continuous pieces of metal and are in the form of elongated ellipses. The metal which I prefer to use is Bessemer steel or wrought-iron.

The frames are preferably made of angle metal, in order to strengthen the device and produce convenient means for attaching the working parts. The frames are connected by hinges, which permit of the horizontal and vertical movement of the frame with respect to each other. The preferred form of hinge is shown in Fig. 6 of the drawings. This consists of the strip H, of metal, secured to the side frame by a bolt passing through the strip and through a hole, $a$, in the front of the side frame. The piece $h$ is connected to the frame in such manner as to allow the same to turn on the bolt D, by which it is held, in order to move the side frame horizontally. The end of the strip H is bent into a loop in the end of a strip, $h'$, which is securely bolted to the middle frame and extends over each side, to furnish means of attaching the strips from each of the wings or side frames. By this form of hinge both a vertical and a horizontal movement of the frames are permitted.

In Fig. 7 of the drawings I have shown a modified form of hinge, which may, if desired, be substituted for that just described. In the modified form of hinge the center piece is provided with a loop, $j$, and the side piece is provided with an eye, $k$, which receives the loop.

C represents a bar of metal secured by suitable bolts to the front of the frames at the point where the hinges are attached. When this bar is bolted down firmly across the frame, it bears upon the hinges and prevents the vertical movement, thus furnishing a rigid harrow. By loosening the bolts which hold this bar a vertical movement is allowed the frames, in order to compensate for any unevenness in the ground and to insure contact of the teeth with all the soil over which the harrow passes. The hinges are attached to the middle frame at a point a short distance in rear of the front end, and a clevis is attached at its front end to facilitate the attachment of a whiffletree. The rear end of the frame is provided with a caster-wheel, by which it is supported. To the under side of the front part of the middle frame are attached wings or blades $A^2$ $A^2$, which run along in advance of the blades and throw the dirt into the line of the teeth or blades on the side frames. The side frames are retained at any desired angle to the middle frame by the bar E, pivoted to the middle frame by the pin or bolt E'. Each of the side frames is provided with a clip, $a'$, having holes for the reception of bolts, which pass through the clip and through any one of the holes in the ends of the bar E which may be coincident with the clips. When so desired, the frames may be folded together, as shown in Fig. 2, in order to occupy a minimum amount of space in transportation or storage. The spring F, supporting at its upper end the seat G, is attached to the middle frame by the bolt E', which holds the bar E, so that no additional means for securing the seat is needed.

As an additional means of rendering the frames rigid when in use, I provide the braces I, which are pivoted to the middle frame and are provided with bent ends which enter eyes $i$, secured to the side frames at convenient points, the joint between the ends of the braces and the eyes being of such form that a vertical movement which may be allowed the side frames will not be interfered with.

The tooth or blade which is found to be particularly adapted for the purpose, and which I prefer to use on my harrow, is shown in Fig. 5 of the drawings. This tooth, which is designated by the letter B in the drawings, is made up of the front cutting-edge, $b$, which is retained in a position coincident with the line of draft during the operation of the harrow, whatever may be the relative position of the harrow-frames, the flange $b^5$, the curved portion $b'$, and the projection $b^4$. In the operation of this tooth or blade the sharp front edge, $b$, cuts into the soil a sufficient distance to loosen the top crust. The curved portion moves the cut soil a short distance laterally, and the projection accomplishes the evening of the soil and leaves the surface thereof level after the passage of the harrow.

The teeth or blades are attached to the frames by bolts $b^6$ and $b^7$, which pass through openings $b^2$ in the flange $b^3$, and through holes and the slots $a^2$ in the horizontal flanges of the frames A.

The position of the teeth or blades may be adjusted with relation to the frames by the aid of the slots $a^2$ to always keep the front portion, $b$, of the tooth or blade in line with the direction in which the harrow is moving.

When a leveler alone is desired, the wings or side frames are placed upon opposite sides of the middle frame, or on diametrically-opposite sides to the positions in which they are shown in Fig. 1. In this position the teeth or blades would be placed at an angle to the line of draft in order not to cut, but simply move the soil to fill indentations. This change may be effected by simply uncoupling the hinges, taking out the bolts from the ends of the cross-bar C, transferring each side section to the position of the other, and connecting the sections by replacing the bolts in the ends of the cross-bar.

Having thus described my invention, what I claim as new, and desire to secure by Letters Patent, is—

1. In a pulverizing-harrow, the combination, with a central section, of two side sections hinged to the central section, and cutting-blades rigidly fastened to said side sections, the frame of each of said side sections consisting of two parallel bars separated by a suitable space and having their ends joined by preferably integral transverse connections, substantially as and for the purpose set forth.

2. The combination of the three hinged frames A' A A', each consisting of two suitably separated parallel bars joined at their ends by transverse connections, and the outer bar of each of the frames A' A' being bored and the inner one slotted, substantially as shown and described, and stirring-blades having their front ends fastened by bolts passing through the holes in said outer bars, and their rear ends adjustably secured by bolts passing through the slots in said inner bars, substantially as and for the purpose set forth.

In testimony whereof I affix my signature in presence of two witnesses.

RICHARD L. LUKENS.

Witnesses:
DAVID H. MEAD,
A. KEITHLEY.